United States Patent
Hu et al.

(10) Patent No.: US 10,420,155 B2
(45) Date of Patent: Sep. 17, 2019

(54) DISTRIBUTED WI-FI SETUP SYSTEMS AND METHODS

(71) Applicant: Plume Design, Inc., Palo Alto, CA (US)

(72) Inventors: Kaixiang Hu, Fremont, CA (US); Sameer Vaidya, Saratoga, CA (US); Kiran Edara, Cupertino, CA (US); Paul White, Burlingame, CA (US); Aman Singla, Saratoga, CA (US); Evan Jeng, Los Altos Hills, CA (US); Balaji Rengarajan, Campbell, CA (US)

(73) Assignee: Plume Design, Inc., Palo Alto, CA (US)

( * ) Notice: Subject to any disclaimer, the term of this patent is extended or adjusted under 35 U.S.C. 154(b) by 67 days.

(21) Appl. No.: 15/463,593

(22) Filed: Mar. 20, 2017

(65) Prior Publication Data

US 2017/0273122 A1    Sep. 21, 2017

Related U.S. Application Data

(60) Provisional application No. 62/310,594, filed on Mar. 18, 2016.

(51) Int. Cl.
| | |
|---|---|
| H04W 4/00 | (2018.01) |
| H04W 76/11 | (2018.01) |
| H04L 12/24 | (2006.01) |
| H04W 12/06 | (2009.01) |
| H04W 24/02 | (2009.01) |
| H04W 84/12 | (2009.01) |

(52) U.S. Cl.
CPC ......... *H04W 76/11* (2018.02); *H04L 41/0856* (2013.01); *H04L 41/12* (2013.01); *H04W 12/06* (2013.01); *H04W 24/02* (2013.01); *H04W 84/12* (2013.01)

(58) Field of Classification Search
USPC ........................ 370/229, 230, 241, 252, 328
See application file for complete search history.

(56) References Cited

U.S. PATENT DOCUMENTS

| | | | |
|---|---|---|---|
| 7,315,533 | B2 | 1/2008 | Theobold et al. |
| 7,414,978 | B2 | 8/2008 | Lun et al. |
| 7,953,403 | B2 | 5/2011 | Nientiedt |
| 8,798,021 | B2 | 8/2014 | Mangalvedhe et al. |
| 9,060,279 | B2 | 6/2015 | Ganu et al. |
| 9,066,251 | B2 | 6/2015 | Madan et al. |
| 9,131,391 | B2 | 9/2015 | Madan et al. |
| 9,131,392 | B2 | 9/2015 | Madan et al. |
| 9,420,528 | B2 | 8/2016 | Madan et al. |

(Continued)

*Primary Examiner* — Kwang B Yao
*Assistant Examiner* — Nguyen H Ngo
(74) *Attorney, Agent, or Firm* — Clements Bernard Walker PLLC; Lawrence A. Baratta, Jr.

(57) ABSTRACT

Systems and methods for setting up an access point in a Wi-Fi system, subsequent to booting up, determining whether the access point is a gateway node with a connection to a modem/router or a Wi-Fi node without a connection to the modem/router; connecting to a cloud configuration service when the access point is a gateway node for obtaining configuration parameters of the Wi-Fi system; and connecting to a predefined Service Set Identifier (SSID) when the access point is a Wi-Fi node for obtaining the configuration parameters from the gateway node.

20 Claims, 11 Drawing Sheets

(56) References Cited

U.S. PATENT DOCUMENTS

| | | | |
|---|---|---|---|
| 9,497,700 B2 | 11/2016 | Madan et al. | |
| 9,510,214 B1 * | 11/2016 | Balasubramaniam | H04W 24/02 |
| 9,516,579 B1 | 12/2016 | Diner et al. | |
| 2006/0258395 A1 | 11/2006 | Cave et al. | |
| 2007/0149172 A1 | 6/2007 | Dickinson | |
| 2007/0242621 A1 | 10/2007 | Nandagopalan et al. | |
| 2008/0013558 A1 * | 1/2008 | Ito | H04W 36/08 370/404 |
| 2009/0257380 A1 | 10/2009 | Meier | |
| 2009/0279427 A1 | 11/2009 | Ji et al. | |
| 2009/0316585 A1 | 12/2009 | Srinivasan | |
| 2009/0323632 A1 | 12/2009 | Nix | |
| 2010/0313262 A1 * | 12/2010 | Mehta | H04L 63/0823 726/12 |
| 2011/0039554 A1 | 2/2011 | Bims | |
| 2011/0151886 A1 | 6/2011 | Grayson et al. | |
| 2012/0002567 A1 | 1/2012 | Sun et al. | |
| 2012/0087268 A1 | 4/2012 | Savoor et al. | |
| 2012/0122503 A1 | 5/2012 | Ma et al. | |
| 2012/0257585 A1 | 10/2012 | Sydor et al. | |
| 2013/0201857 A1 | 8/2013 | Bhargava et al. | |
| 2013/0272285 A1 | 10/2013 | Goldsmith et al. | |
| 2014/0092765 A1 | 4/2014 | Agarwal et al. | |
| 2014/0126410 A1 | 5/2014 | Agarwal et al. | |
| 2014/0169221 A1 * | 6/2014 | Cha | H04L 41/0806 370/255 |
| 2014/0195654 A1 * | 7/2014 | Kiukkonen | H04W 8/00 709/220 |
| 2014/0328190 A1 | 11/2014 | Lord et al. | |
| 2014/0334469 A1 * | 11/2014 | Chen | H04W 16/06 370/338 |
| 2016/0080949 A1 | 3/2016 | Chandrasekhar et al. | |
| 2016/0094387 A1 * | 3/2016 | Stephenson | H04L 63/0823 709/222 |
| 2016/0212695 A1 * | 7/2016 | Lynch | H04W 48/08 |
| 2016/0323810 A1 * | 11/2016 | May | H04L 12/46 |
| 2016/0353353 A1 * | 12/2016 | Sung | H04L 12/66 |
| 2016/0374133 A1 * | 12/2016 | Logue | H04W 8/005 |
| 2017/0310640 A1 * | 10/2017 | Chechani | H04W 12/08 |
| 2018/0070395 A1 * | 3/2018 | Bradish | H04W 8/26 |

* cited by examiner

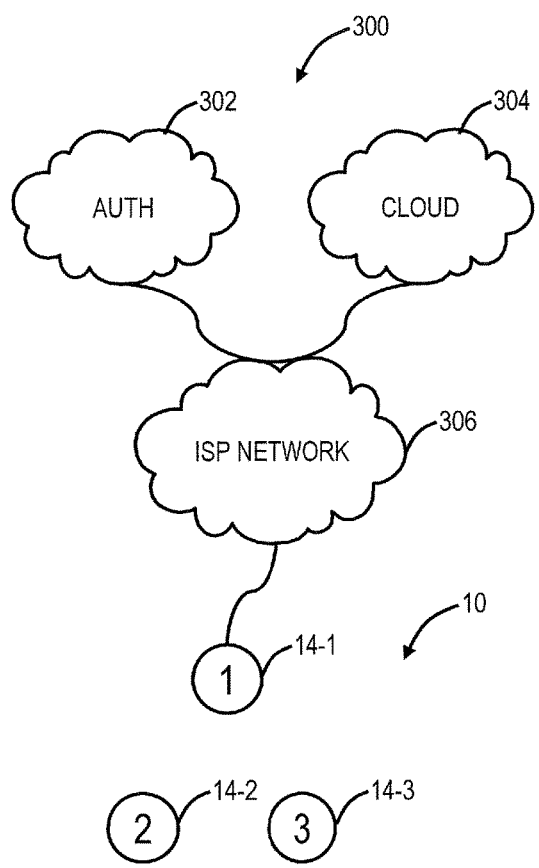 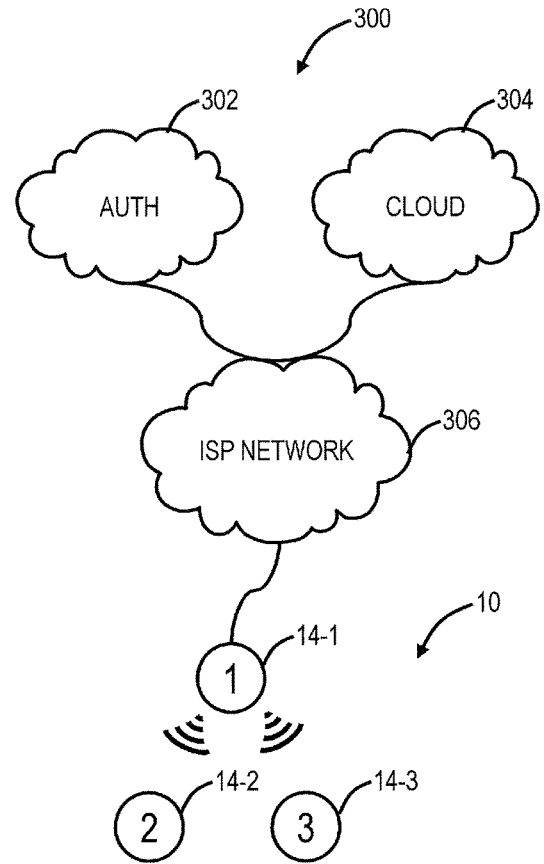
*FIG. 7A*  *FIG. 7B*

DISTRIBUTED WI-FI SETUP SYSTEMS AND METHODS

CROSS-REFERENCE TO RELATED APPLICATION(S)

The present patent/application claims priority to U.S. Provisional Patent Application No. 62/310,594, filed Mar. 18, 2016, and entitled "DISTRIBUTED WI-FI SETUP," the contents of which are incorporated by reference.

FIELD OF THE DISCLOSURE

The present disclosure generally relates to wireless networking systems and methods. More particularly, the present disclosure relates to distributed Wi-Fi setup systems and methods in a distributed Wi-Fi system.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where range is determined by the long range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3× the airtime, generating 3× the interference to neighboring Wi-Fi networks.

BRIEF SUMMARY OF THE DISCLOSURE

In an exemplary embodiment, a method for setting up an access point in a Wi-Fi system includes, subsequent to booting up, determining whether the access point is a gateway node with a connection to a modem/router or a Wi-Fi node without a connection to the modem/router; connecting to a cloud configuration service when the access point is a gateway node for obtaining configuration parameters of the Wi-Fi system; and connecting to a predefined Service Set Identifier (SSID) when the access point is a Wi-Fi node for obtaining the configuration parameters from the gateway node. The access point can be configured with a certificate enabling communication on the predefined SSID. The access point can continue to serve the predefined SSID after configuration and during normal operation to support lost nodes, new nodes, and recovery of nodes. Prior to the determining, the access point can be claimed and information regarding the access point is communicated to a backhaul network configuration service in the cloud configuration service. During the setting up, the Wi-Fi system can include a tree topology with a single data path between each node and the gateway node. Prior to the connecting to the cloud service, the method can further include receiving the location of the cloud configuration service from a registry service which is configured by an administrator with a location of the cloud configuration service, wherein the access point is programmed with a location of the registry service. The configuration parameters can include a list of access points allowed to connect to the Wi-Fi system and access points which are not on the list are prevented from connecting to the Wi-Fi system.

The configuration parameters can include a plurality of a configuration for Wi-Fi service between nodes in the Wi-Fi system, a configuration for Wi-Fi service between nodes and the user's client devices, an authentication server location, traffic forwarding and routing on the gateway node, and facility settings. The method can further include, subsequent to a power failure and recovery, enabling a configuration based on a last known configuration prior to the power failure including connections to one or more of parent nodes and child nodes in the Wi-Fi system. The method can further include, subsequent to a power failure and recovery, utilizing the predefined SSID to repeat the determining and the connecting steps. The method can further include, prior to the access point communicating with the cloud configuration service, preventing other nodes from connecting to the access point to prevent loops. The method can further include configuring the access point with the configuration parameters and notifying the cloud configuration service of a resulting topology of the Wi-Fi system.

In another exemplary embodiment, an access point in a Wi-Fi system includes a plurality of radios configured to communicate via Wi-Fi; and a processor communicatively coupled to the plurality of radios and configured to, subsequent to boot up, determine whether the access point is a gateway node with a connection to a modem/router or a Wi-Fi node without a connection to the modem/router; connect to a cloud configuration service when the access point is a gateway node to obtain configuration parameters of the Wi-Fi system; and connect to a predefined Service Set Identifier (SSID) when the access point is a Wi-Fi node to obtain the configuration parameters from the gateway node. The access point can be configured with a certificate enabling communication on the predefined SSID. Prior to determination of the gateway node or the Wi-Fi node, the access point can be claimed and information regarding the access point is communicated to a backhaul network configuration service in the cloud configuration service. During setup, the Wi-Fi system can include a tree topology with a single data path between each node and the gateway node. Prior to connection to the cloud configuration service, the processor can be configured to receive the location of the cloud configuration service from a registry service which is configured by an administrator with a location of the cloud configuration service, wherein the access point is programmed with a location of the registry service. The configuration parameters can include a list of access points allowed to connect to the Wi-Fi system and access points which are not on the list are prevented from connecting to the Wi-Fi system. The configuration parameters can include an SSID, a configuration for Wi-Fi service between nodes in the Wi-Fi system, an authentication server location, traffic forwarding and routing on the gateway node, and facility settings.

In a further exemplary embodiment, a cloud system communicatively coupled to a Wi-Fi system for management thereof includes a registry service executed on a first server; and a configuration service executed on one of a first server and a second server; wherein the registry service is configured to communicate with an access point in the Wi-Fi system to provide a location of the configuration service; and wherein the configuration service is configured to communicate with a gateway node in the Wi-Fi system and to provide configuration parameters to the gateway node.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7A is a network diagram of a network where the distributed Wi-Fi system of FIG. 1 is initially connected to external services;

FIG. 7B is a network diagram of the network of FIG. 7A where a gateway access point is configured by the external services;

DETAILED DESCRIPTION OF THE DISCLOSURE

Again, in various exemplary embodiments, the present disclosure relates to data gathering systems and methods to enable the optimization of distributed Wi-Fi networks. It is an objective of the systems and methods to provide a Wi-Fi network with superior performance relative to Wi-Fi networks with a single AP, with repeaters, or with multiple mesh nodes. The systems and methods include a distributed Wi-Fi system with a plurality of access points (nodes) which are self-optimizing based on cloud-based control. This self-optimization adapts the topology and configuration of the plurality of access points in real-time based on the operating environment. The plurality of access points communicate with one another via backhaul links and to Wi-Fi client devices via client links, and the each of the backhaul links and each of the client links may use different channels based on the optimization, thereby avoiding the aforementioned limitations in Wi-Fi mesh or repeater systems. In an exemplary aspect, the distributed Wi-Fi system includes a relatively large number of access points (relative to conventional deployments including Wi-Fi mesh or repeater systems). For example, the large number of access points can be 6 to 12 or more in a typical residence. With a large number of access points, the distance between any two access points is small, on a similar scale as the distance between an access point and Wi-Fi client device. Accordingly, signal strength is maintained avoiding coverage issues, and with the optimization of the topology and configuration, congestion and interference are minimized. Thus, the distributed Wi-Fi system addresses all three of the aforementioned limitations in conventional Wi-Fi systems.

The distributed Wi-Fi setup systems and methods describe various approaches for how access points, i.e., nodes in the distributed Wi-Fi system, are initiated into the network. That is, the distributed Wi-Fi setup systems and methods describe how nodes initially communicate to the cloud. The distributed Wi-Fi setup systems and methods describe an onboarding process for nodes in the distributed Wi-Fi system. The distributed Wi-Fi setup systems and methods address the problem of establishing secure and reliable connections between nodes in a distributed Wi-Fi solution controlled from the cloud by an external provisioning application. It is applicable in several scenarios. It can be used for the initial process of establishing the distributed Wi-Fi system. It can be used when a new node is added into an existing network. It can be used when changing the topology of the network, as the connections between nodes are reorganized. It also can be used to re-establish the network if the network is disrupted by a power outage or other event.

Distributed Wi-Fi System

Figure 1:
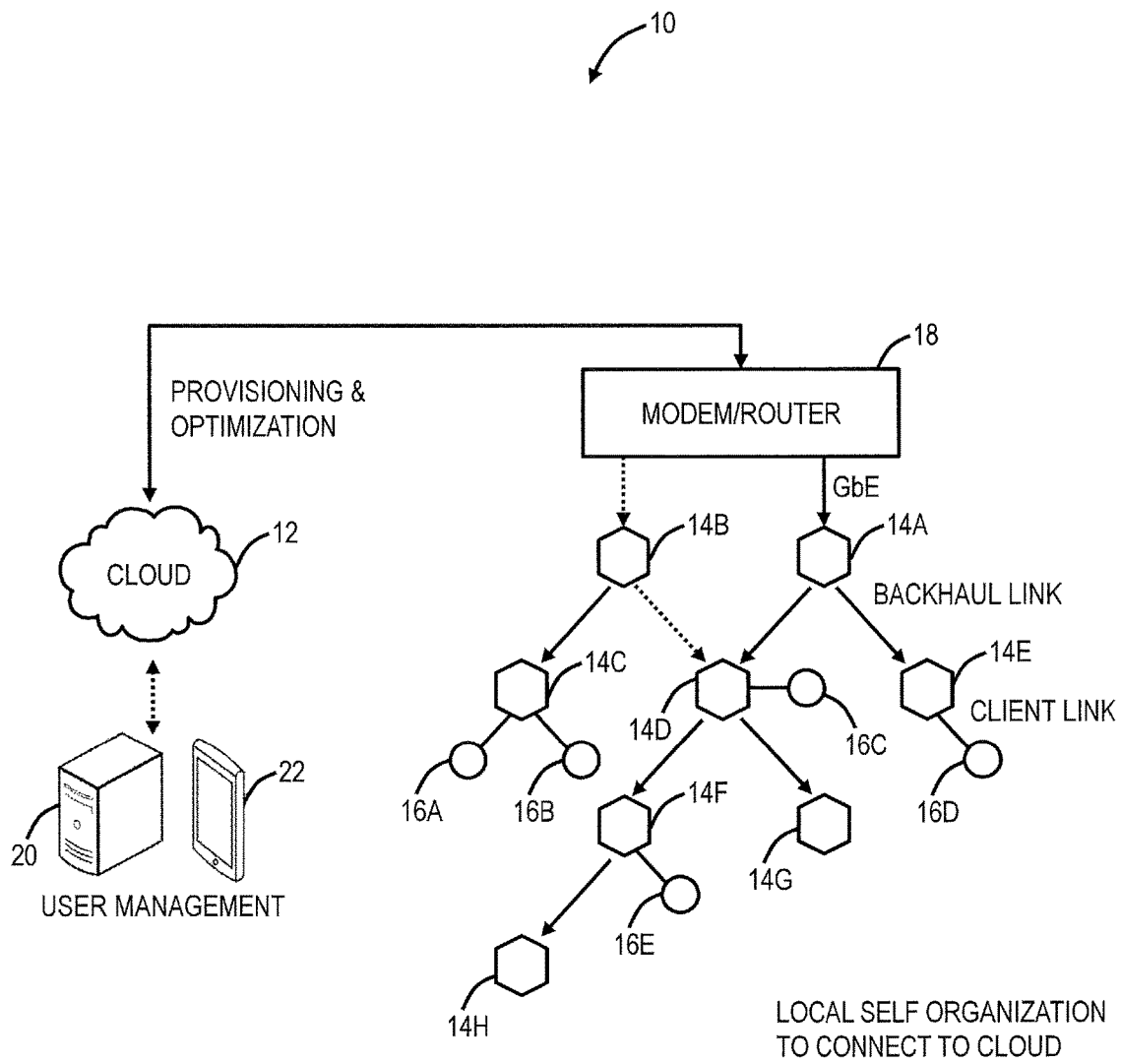
FIG. 1 is a network diagram of a distributed Wi-Fi system with cloud-based control.

Referring to FIG. 1, in an exemplary embodiment, a network diagram illustrates a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an exemplary aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
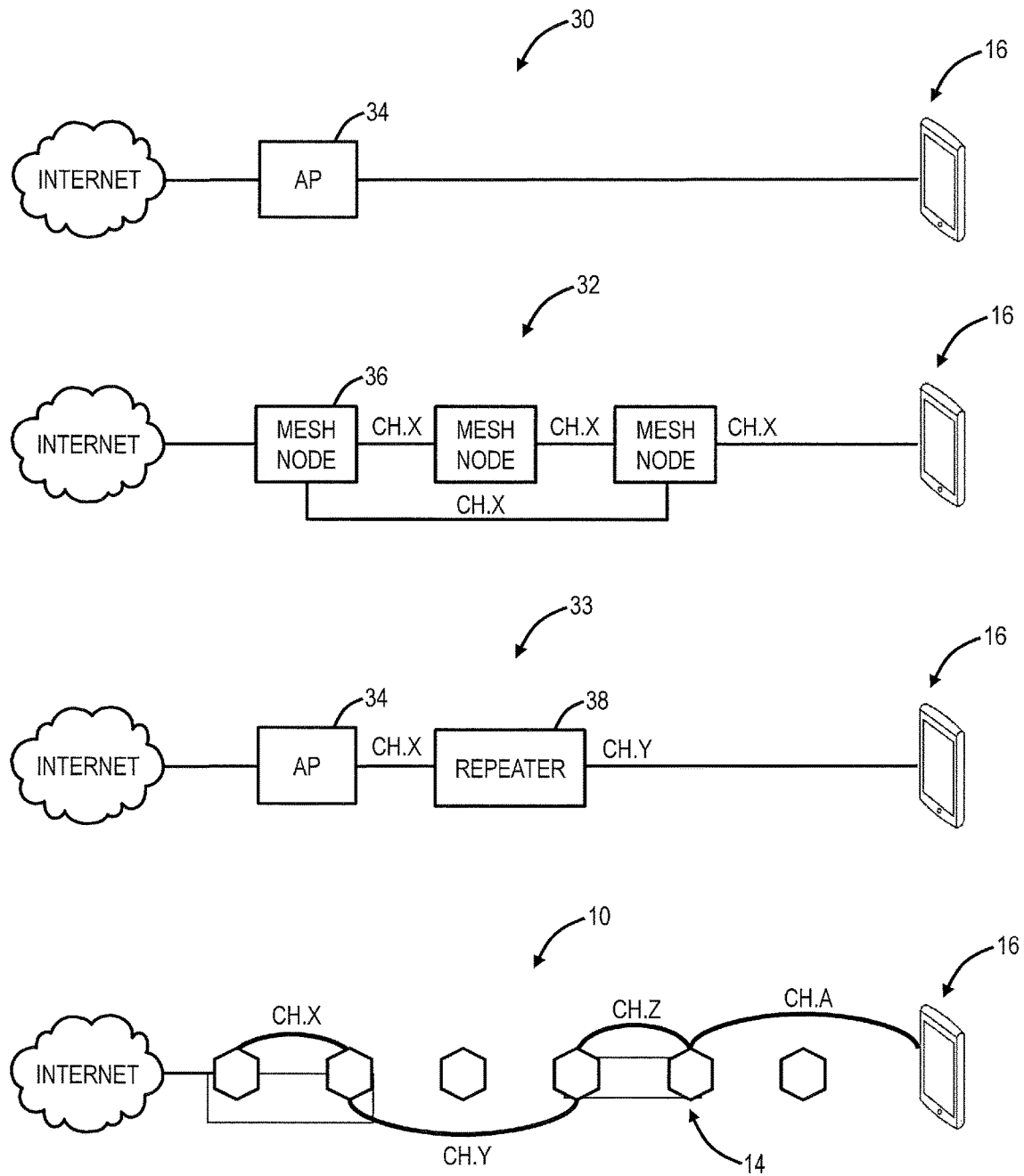
FIG. 2 is a network diagram of differences in operation of the distributed Wi-Fi system of FIG. 1 relative to a conventional single access point system, a Wi-Fi mesh network, and a Wi-Fi repeater system.

Referring to FIG. 2, in an exemplary embodiment, a network diagram illustrates differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an exemplary aspect, the servers 20 in the cloud 12 are configured to optimize channel selection for the best user experience.

Configuration and Optimization Process for the Distributed Wi-Fi System

Figure 3:
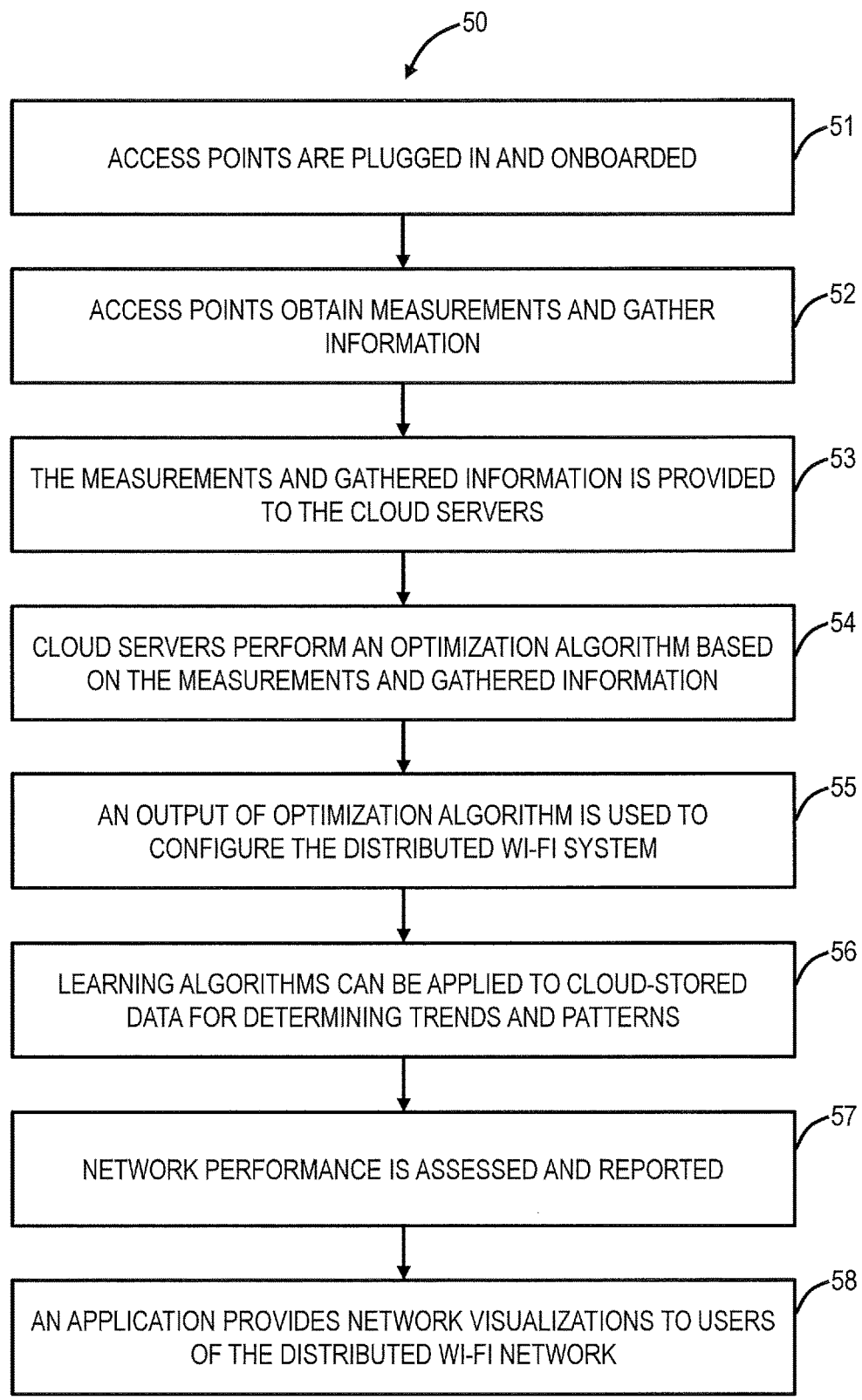
FIG. 3 is a flowchart of a configuration and optimization process for the distributed Wi-Fi system of FIG. 1.
Figure 4:
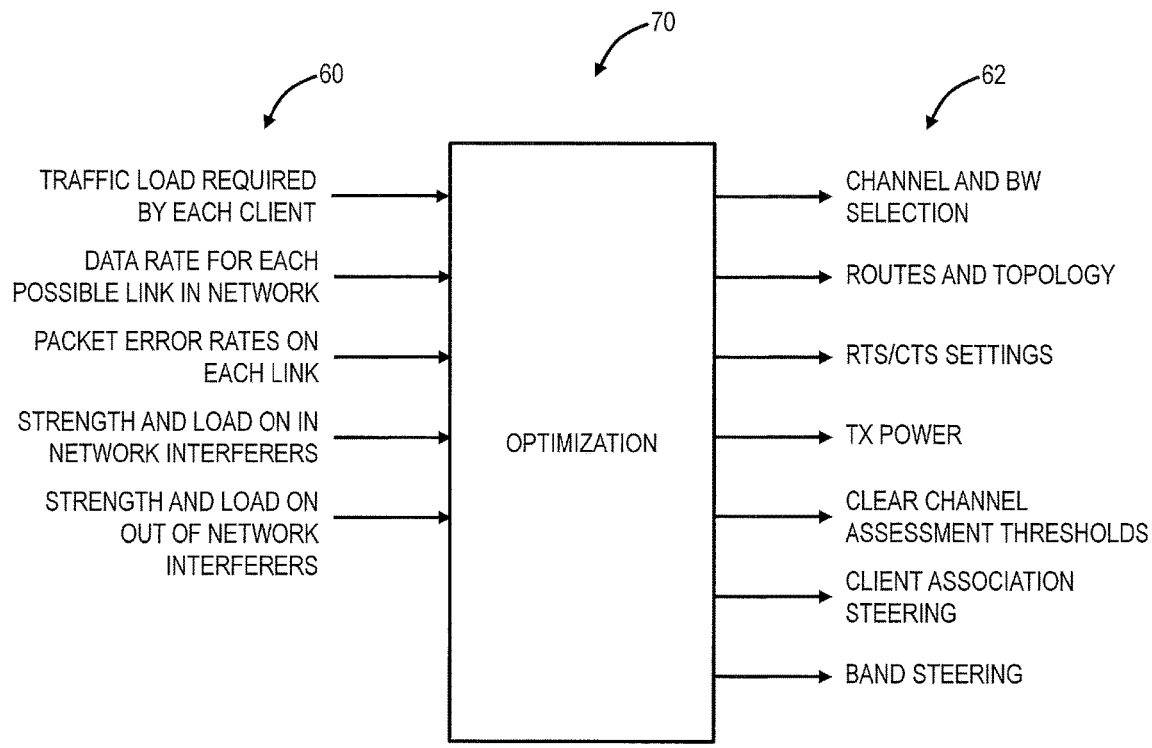
FIG. 4 is a block diagram of inputs and outputs to an optimization as part of the configuration and optimization process of FIG. 3.

Referring to FIG. 3, in an exemplary embodiment, a flowchart illustrates a configuration and optimization process 50 for the distributed Wi-Fi system 10. Specifically, the configuration and optimization process 50 includes various steps 51-58 to enable efficient operation of the distributed Wi-Fi system 10. These steps 51-58 may be performed in a different order and may be repeated on an ongoing basis, allowing the distributed Wi-Fi system 10 to adapt to changing conditions. First, each of the access points 14 are plugged in and onboarded (step 51). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 51 ensures a newly installed access point 14 connects to the distributed Wi-Fi system 10 so that the access point can receive commands and provide data to the servers 20. The onboarding step 51 can include configuring the access point with the correct Service Set Identifier (SSID) (network ID) and associated security keys. In an exemplary embodiment, the onboarding step 51 is performed with Bluetooth or equivalent connectivity between the access point 14 and a user device 22 allowing a user to provide the SSID, security keys, etc. Once onboarded, the access point 14 can initiate communication over the distributed Wi-Fi system 10 to the servers 20 for configuration.

Second, the access points 14 obtain measurements and gather information to enable optimization of the networking settings (step 52). The information gathered can include signal strengths and supportable data rates between all nodes as well as between all nodes and all Wi-Fi client devices 16. Specifically, the measurement step 52 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 52 is provided to the servers 20 in the cloud 12 (step 53). The steps 51-53 are performed on location at the distributed Wi-Fi system 10.

These measurements in steps 52, 53 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 54). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 10 (step 55). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 56). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 57). Eighth, an application (such as a mobile app operating on the user device 22) can provide a user visibility into the network operation (step 58). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 50 is described herein with reference to the distributed Wi-Fi system 10 as an exemplary embodiment. Those skilled in the art will recognize the configuration and optimization process 50 can operate with any type of multiple node Wi-Fi system including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed wi-fi network" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Referring to FIG. 3, in an exemplary embodiment, a block diagram illustrates inputs 60 and outputs 62 to an optimization 70. The inputs 60 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 70. The outputs of the optimization 70 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 5:
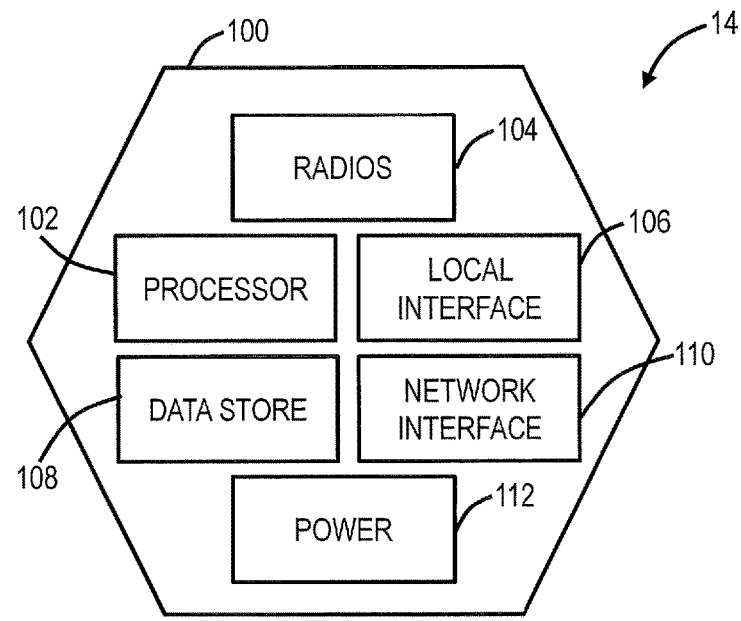
FIG. 5 is a block diagram of functional components of the access point in the distributed Wi-Fi system of FIG. 1.

Referring to FIG. 5, in an exemplary embodiment, a block diagram illustrates functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 5 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connection to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an exemplary embodiment, the access points 14 support dual band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an exemplary embodiment, all of the access points 14 in the distributed Wi-Fi system 10 include the network interface 110. In another exemplary embodiment, select access points 14 which connect to the modem/router 18 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 6:
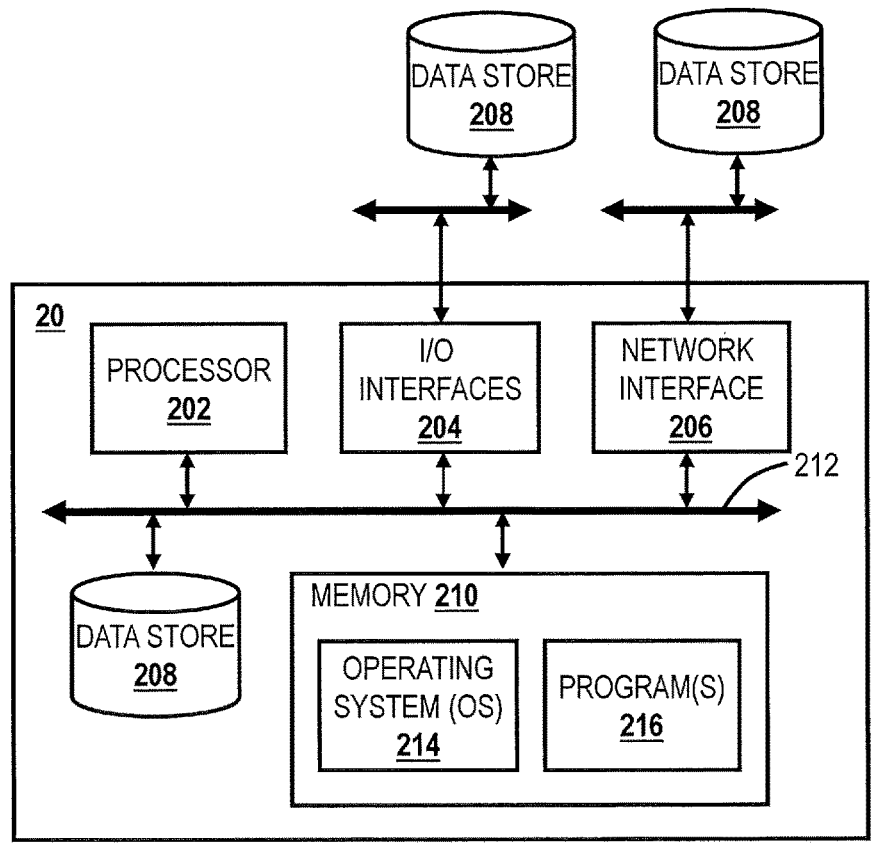
FIG. 6 is a block diagram of functional components of a server, a Wi-Fi client device, or a user device which may be used with the distributed Wi-Fi system of FIG. 1.

Referring to FIG. 6, in an exemplary embodiment, a block diagram illustrates functional components of the server 20, the Wi-Fi client device 16, or the user device 22 which may be used with the distributed Wi-Fi system 10. FIG. 6 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

Wi-Fi Setup for Establishing Communications

Again, more specifically, the distributed Wi-Fi systems and methods ensure that all access points 14 that provide Wi-Fi client access services in the distributed Wi-Fi system 10 will have a single, secure and reliable data path through the Wi-Fi network to the gateway 18 which has the connection to the cloud 12. One of the problems with the mesh, repeaters, or conventional distributed Wi-Fi approaches is initial network setup. Typically, Wi-Fi network setup requires some sort of manual user interactions, typically to enter Wi-Fi network SSID and password used for inter-node connections. This procedure is cumbersome and prone to errors. The problem is multiplied when multiple nodes must be set up as in mesh, repeater, or distributed Wi-Fi approaches. In addition, connecting to each node using a standard client with Wi-Fi capabilities is sometimes problematic as not all Wi-Fi clients give a user the opportunity to select a device to connect based on the Basic Service Set Identifier (BSSID, equivalent to the MAC address of the specific node or access point). In particular Microsoft Windows does not allow selection of a specific AP to connect to via the BSSID or other means. That limitation puts additional burden on a user with limited technical skills, and only increases time required to complete initial network setup.

A related problem of initial network setup is the amount of data a user needs to enter. Some of the current solutions require entering 48-bit unique Physical (PHY) layer identifier (MAC address) for each device being part of Wi-Fi network. Such operation is not only cumbersome but also susceptible to typos which might lead to catastrophic failure (lack of service). Accordingly, it is an objective of the distributed Wi-Fi systems and methods to provide a simpler and more user-friendly approach.

Referring to FIGS. 7A, 7B, 8A, 8B, and 9, in exemplary embodiments, block diagrams illustrate a network 300 for Wi-Fi setup in the distributed Wi-Fi system 10. The Wi-Fi setup is simple, quick, and efficient using Wi-Fi infrastructure mode connections in a bootstrap process. The Wi-Fi setup includes two external services 302, 304 which connect to the distributed Wi-Fi system 10 via a network 306 (e.g., the Internet, the cloud, an Internet Service Provider (ISP) network, etc.). The external services 302, 304 are available to all Wi-Fi access points 14 which are authorized to become part of the distributed Wi-Fi system 10. The external services 302, 304 include a remote device authentication server 302 and a remote distributed Wi-Fi network controller 304 (cloud). The use of the external services 302, 304 provide significantly reduced user interaction for establishing communication in the distributed Wi-Fi system than conventional approaches.

Figures 8A, 8B:
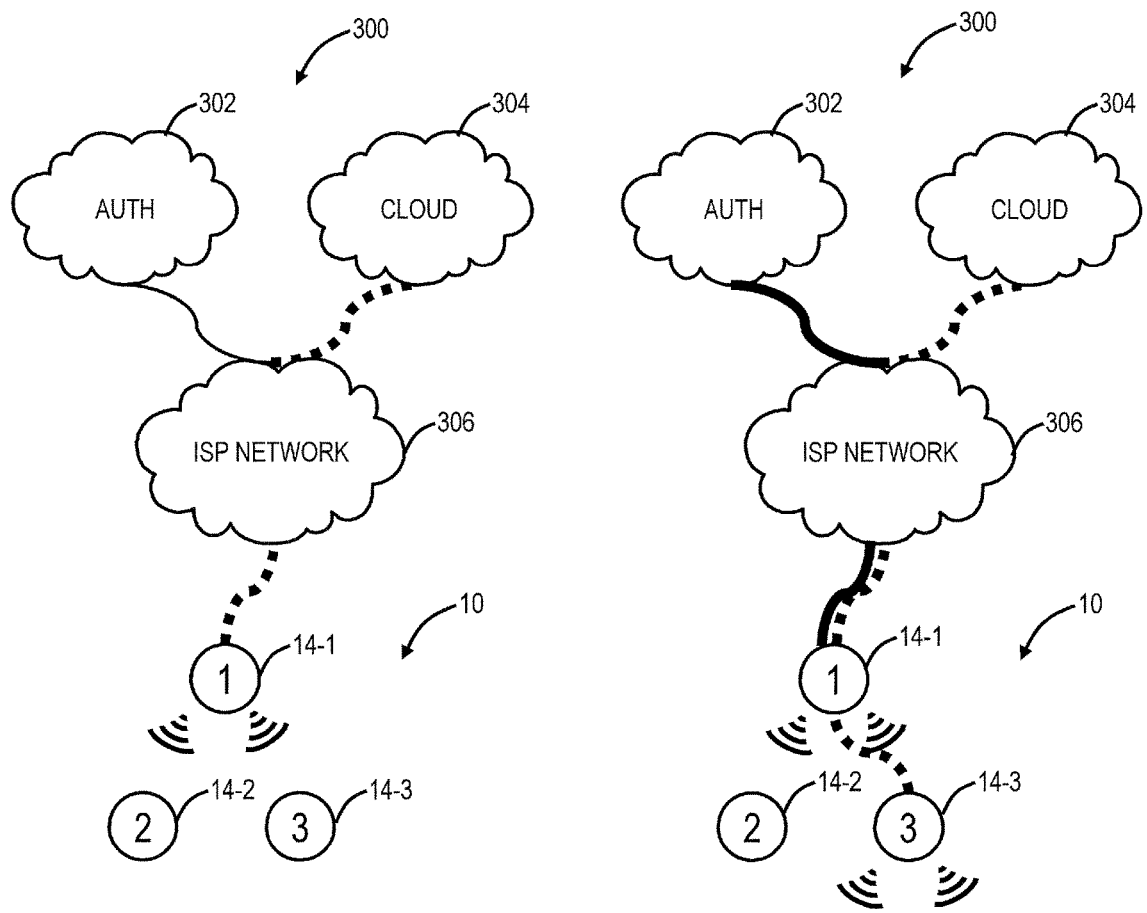
FIG. 8A is a network diagram of the network of FIGS. 7A and 7B where the gateway access point onboards other access points and starts provisioning Wi-Fi service.
FIG. 8B is a network diagram of the network of FIGS. 7A, 7B, and 8A where another access point onboards other access points and starts provisioning Wi-Fi service.
Figure 9:
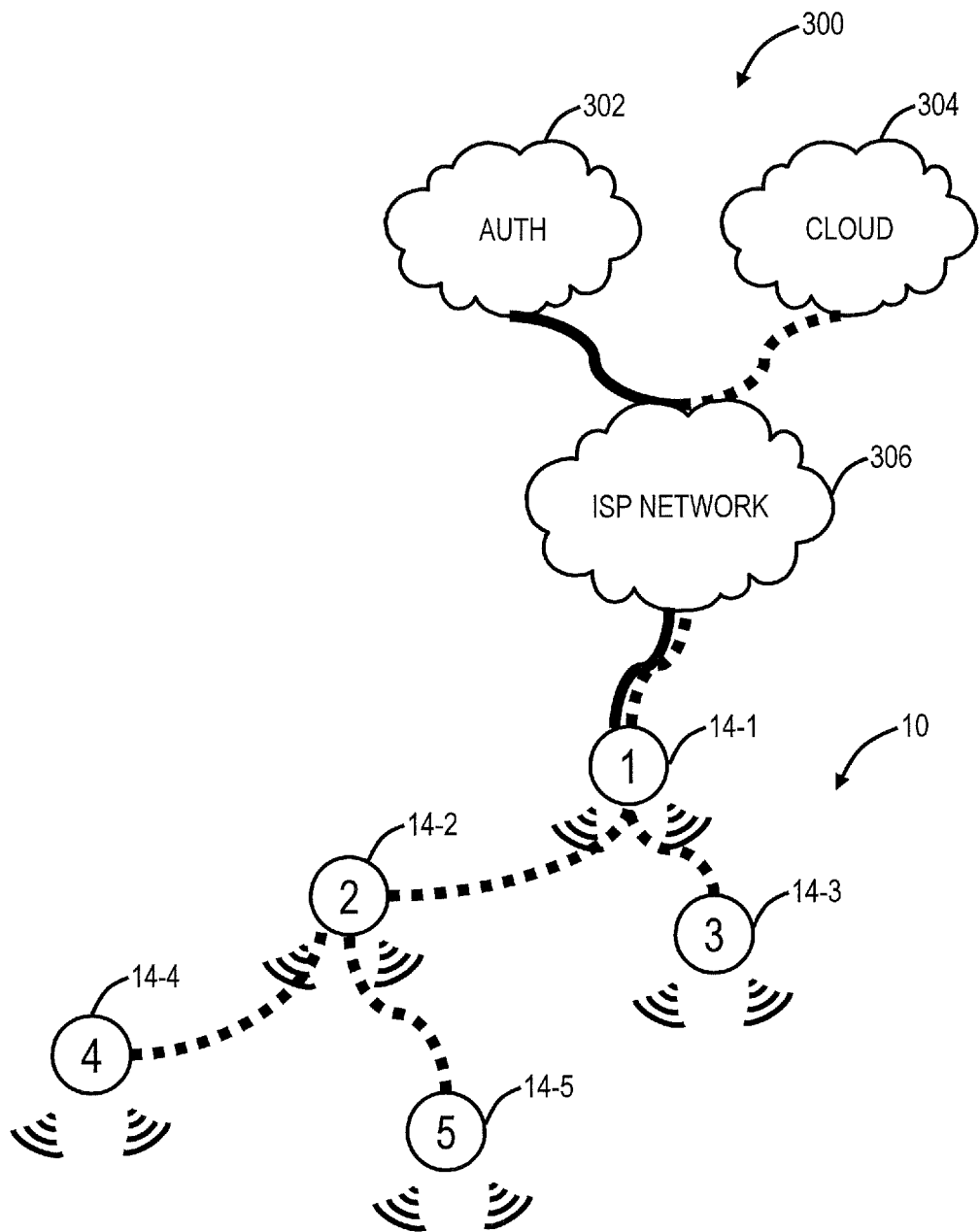
FIG. 9 is a network diagram of the network of FIGS. 7A, 7B, 8A, and 8B where another access point onboards and starts provisioning Wi-Fi service for additional access points.

FIG. 7A illustrates the network 300 where the distributed Wi-Fi system 10 is initially connected to the external services 302, 304. FIG. 7B illustrates the network 300 where a gateway access point 14-1 is configured by the external services 302, 304. FIG. 8A illustrates the network 300 where the gateway access point onboards other access points 14-2, 14-2 and starts provisioning Wi-Fi service. FIG. 8B illustrates the network 300 where the access point 14-3 onboards other access points and starts provisioning Wi-Fi service. FIG. 9 illustrates the network 300 where the access point 14-3 onboards and starts provisioning Wi-Fi service for access points 14-4, 14-5.

The Wi-Fi setup includes the gateway access point 14-1 which connects to the modem/router 18 which connects to the network 306. Once connected, the gateway access point 14-1 connects to the external services 302, 304 and starts provisioning of user Wi-Fi service. A Wi-Fi network topology that does not contain loops is ensured by a bootstrapping process described herein.

As described herein, the distributed Wi-Fi system 10 operates based on coordinated operations of several (usually up to 15) Wi-Fi access points 14 ("AP") controlled by a single entity. The goal of distributed Wi-Fi system 10 is to provide better coverage while retaining similar throughput rates as in case of standard, single-point infrastructure mode Wi-Fi solution. For the sake of simplicity, assume, that only a single wired network access is available to the distributed Wi-Fi system 10, i.e., via the modem/router 18. This might be a DSL or cable connection providing Internet connectivity to the residence where the distributed Wi-Fi system 10 operates. One (randomly selected) access point 14-1 will be connected to ISP network 306 using an Ethernet wired connection associated with the access point 14-1. All other access points 14-2, 14-3, 14-4, 14-5 (sometimes also referred as nodes) are connected either to the gateway access point 14-1 or to one of other access points based on best quality of service criterion. When connecting to an upstream peer each access point 14 is acting as a Wi-Fi STA (Station) client and the parent node is acting as infrastructure mode access point 14. Therefore, based on its role in the distributed Wi-Fi system 10, a single access point 14 might have one of two possible roles: Gateway node (GW) and Wi-Fi node (node).

The gateway node is the access point 14-1 with a single wired Wide Area Network (WAN) connection. It has a critical role in the distributed Wi-Fi system 10 as all user traffic initiated by any Wi-Fi client connected to the distributed Wi-Fi system 10 passes through the gateway node. The gateway node also provides infrastructure mode Wi-Fi services for user Wi-Fi clients, as in the case of standard single entity Wi-Fi solution. It also may provide services like firewall and Network Address Translation (NAT), which is up to user setting. The Wi-Fi node role is to provide Wi-Fi infrastructure mode access for all Wi-Fi clients, as well as Wi-Fi infrastructure mode access for other Wi-Fi access points 14. In some instances, it features a single dual-band Wi-Fi STA connection to parent node for user traffic forwarding to or from gateway node and the outside network.

In the distributed Wi-Fi system 10, a single Wi-Fi network includes several independent access points 14. In order to coordinate operations of all access points 14, a single control entity to which each individual access points 14 is connected is utilized. As described herein, this control entity is implemented as an independent service running outside of the Wi-Fi solution, i.e., the external servers 302, 304, and to share this service among (theoretically) unlimited number of distributed Wi-Fi systems 10. This controlling entity can be referred as the cloud 12. Its role is to provision Wi-Fi infrastructure mode parameters, coordinate operations of individual access points 14, prevent access points 14 becoming a part of other private networks and to ensure best possible network performance. Because many aspects of the access point 14 operations are controlled by the cloud services 302, 304, establishing cloud connectivity for each individual access point 14, without cloud assistance (hereafter referred as bootstrapping process) is critical.

The main issues that need to be addressed by the bootstrapping process are: determining the role of the node, i.e., discovering if the node is the gateway node; ensuring that no inter-node connections are established between nodes (parent-child relationship), before the parent is able to reach cloud service and provide general Internet access to Wi-Fi clients; and ensuring that every node will have a single path data path connection to the gateway node.

Figure 10:
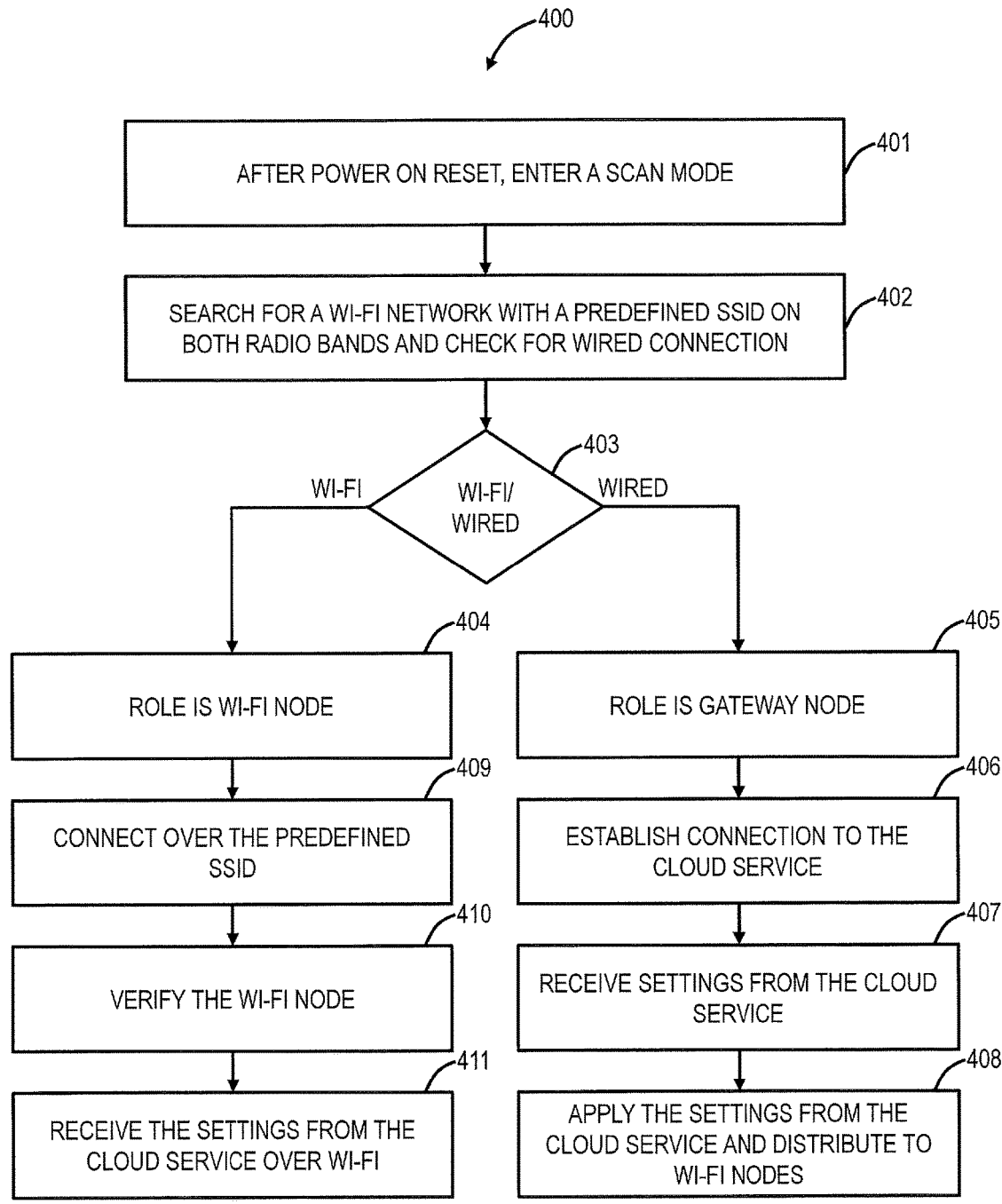
FIG. 10 is a flowchart of a Wi-Fi setup process for establishing communications in the distributed Wi-Fi system.

Referring to FIG. 10, in an exemplary embodiment, a flowchart illustrates a Wi-Fi setup process 400 for establishing communications in the distributed Wi-Fi system 10. The Wi-Fi setup process 400 is described with respect to a single access point 14; those skilled in the art will recognize that all the access points 14 can perform the Wi-Fi setup process 400. After power on reset (e.g., plugging in the access point 14), the access point 14 enters a scan mode (step 401). When the access point 14 is in scan mode, it searches for a Wi-Fi network with a predefined SSID on both radio bands, and, in the scan mode, the access point 14 checks for wired connection availability (step 402).

If the access point 14 detects the presence of a Wi-Fi network with the predefined SSID and is able to connect to it (step 403), it assumes the role of a Wi-Fi node (step 404). If the access point 14 detects the presence of a wired connection (step 403), and it is able to get network configuration using the Dynamic Host Configuration Protocol (DHCP) protocol and to establish a connection to cloud controller (i.e., the service 304), the access point 14 assumes the gateway role (step 405). It is important to emphasize that during the scan mode, the access point 14 does not provide Wi-Fi service for clients nor does it provide Wi-Fi service to other nodes. This prevents user client connections and inter-node connections from being established before the cloud service is reachable.

As soon as the gateway node establishes a connection to the cloud service 304 (step 406), the cloud service 304 sends all the required settings, i.e., parameters, for the gateway to operate properly and the access point 14 receives the settings (step 407). The parameters include Home Wi-Fi service (user Wi-Fi service for allowing connection of Wi-Fi client devices 16), Inter-connections Wi-Fi service (used for inter-node connections), authentication service 302 IP address, all network configurations required for correct user traffic forwarding and routing on the gateway node, all facilities settings (such as DHCP server, DHCP client settings, etc.) required for correct solution operations, white-list of nodes allowed to connect to this private network, etc. As soon as gateway node receives these settings, they are applied in device software, and Wi-Fi services for both other nodes and user clients are enabled (step 408).

When a Wi-Fi node senses the Wi-Fi network with predefined SSID, it tries to connect to it, using Wi-Fi Protected Access (WPA)-Enterprise mode Wi-Fi protected access protocol (step 409). The parent access point 14 (which the Wi-Fi node connects to over Wi-Fi) first checks if the Wi-Fi node is in network whitelist (list is provided by the cloud service 304) (step 410). If the Wi-Fi node is not in the list of allowed devices, the parent access point 14 will drop client connection. If the Wi-Fi node is in the list of devices allowed to connect to this Wi-Fi network, its credentials are transmitted by the parent access point 14 to the authentication service 302. There, the connecting device credentials are verified. Authentication results are shared back to the parent access point 14 using the Remote Authentication Dial-In User Service (RADIUS) protocol. In case of successful authentication, the Wi-Fi node is allowed to connect to parent access point 14, whereas in case of failed authentication, the Wi-Fi node is blacklisted and denied a connection. Once allowed to connect, the Wi-Fi node receives the settings that were provided by the cloud service 304 to the gateway node (step 411).

The Wi-Fi setup process 400 ensures that only nodes planned to be part of that particular distributed Wi-Fi system 10 are allowed to connect. Only nodes with proper credentials resident on their persistent storage successfully pass authentication process and are allowed to connect to distributed Wi-Fi system 10. Inter-node connections are always encrypted, thus protecting any user traffic.

A node that tries to connect to the distributed Wi-Fi system 10 may try to connect to the same parent node (same BSSID) on and alternative band. If the alternative band network is not reachable, the node will not try to make a connection on the alternative radio band. As soon as the node establishes client Wi-Fi connection to one of the nodes in distributed Wi-Fi system 10, it exits scan mode and enters a regular operation mode.

In the regular operation mode, an access point 14 tries to connect to the cloud service 304. After establishing a connection to the cloud service 304, through the gateway node and potentially other nodes, it will receive the same set of parameters and configuration as a gateway node. Only after receiving all required data from the cloud service 304 will the newly connected node provision Wi-Fi service both to user clients and to other nodes in the distributed Wi-Fi system 10.

The Wi-Fi setup process 400 prevents establishing alternative node-node connections and ensures that there is only a single data path between an individual node in the distributed Wi-Fi system 10. and the gateway node (creating a tree network topology). Such topology ensures that there is no need for additional network protocols for network topology discovery. Each parent has a list of connected clients and sends this list is to the cloud service 304. Because the cloud service 304 receives a list of connected clients from all nodes in distributed Wi-Fi system 10, it has all information needed to determine network topology and act upon its changes.

Once the distributed Wi-Fi system 10 is running, there are several events that can disrupt the distributed Wi-Fi system 10. The distributed Wi-Fi system 10 can have a policy change put upon it by the cloud service 304 to improve its performance. Such a topology change could be implemented in a step by step set of incremental changes. However, it could also be implemented by tearing the network down completely and allowing the network to reform following the procedures described in the Wi-Fi setup process 400. Another source of disruption could be power outages. Several good techniques could be used for recovering from power outages. First, the distributed Wi-Fi system 10 could return to its last known good state before the power outage. This has the advantage that it works even if access to the Internet has not been re-established. It has the disadvantage that the access points 14 need to store state, and likely have some amount of built-in control to re-establish the network without the cloud. The other approach following a power outage would be for the nodes to go through the initial onboarding sequence as described in the Wi-Fi setup process

400. Since this is controlled by the cloud service 400, the nodes would not need any special intelligence to reform the network in this way.

The Wi-Fi setup process 400 is shown in FIGS. 7A, 7B, 8A, 8B, and 9. In FIG. 7A, the authentication service 302 and the cloud service 304 are connected to the Internet and the network 306. The access points 14-1, 14-2, 14-3 are powered on. The gateway access point 14-1 determines it is a gateway node based on its wired connection to the network 306. In FIG. 7B, the gateway access point 14-1 connects to the cloud service 304, receives the settings, and configures. The gateway access point 14-1 begins Wi-Fi services on the predefined SSID for the other access points 14-2, 14-3 and on a home SSID based on the configuration for Wi-Fi clients.

In FIG. 8A, the access points 14-2, 14-3 being the onboarding process as Wi-Fi nodes by connecting to the gateway access point 14-1 over the predefined SSID. In FIG. 8B, gateway access point 14-1 connects to the authentication service 302 to verify the access points 14-2, 14-3. The access point 14-3 communicates to the cloud service 304 based on its connection to the gateway access point 14-1 over the predefined SSID, receives the settings, and configures its Wi-Fi service which includes the predefined SSID and the home SSID.

In FIG. 9, the access points 14-2, 14-3 are onboarded, both providing Wi-Fi services over the predefined SSID and the home SSID. New access points 14-4, 14-5 connect to the access point 14-2 over the predefined SSID, receive the settings, and configure its Wi-Fi service which includes the predefined SSID and the home SSID.

Registry

Figure 11:
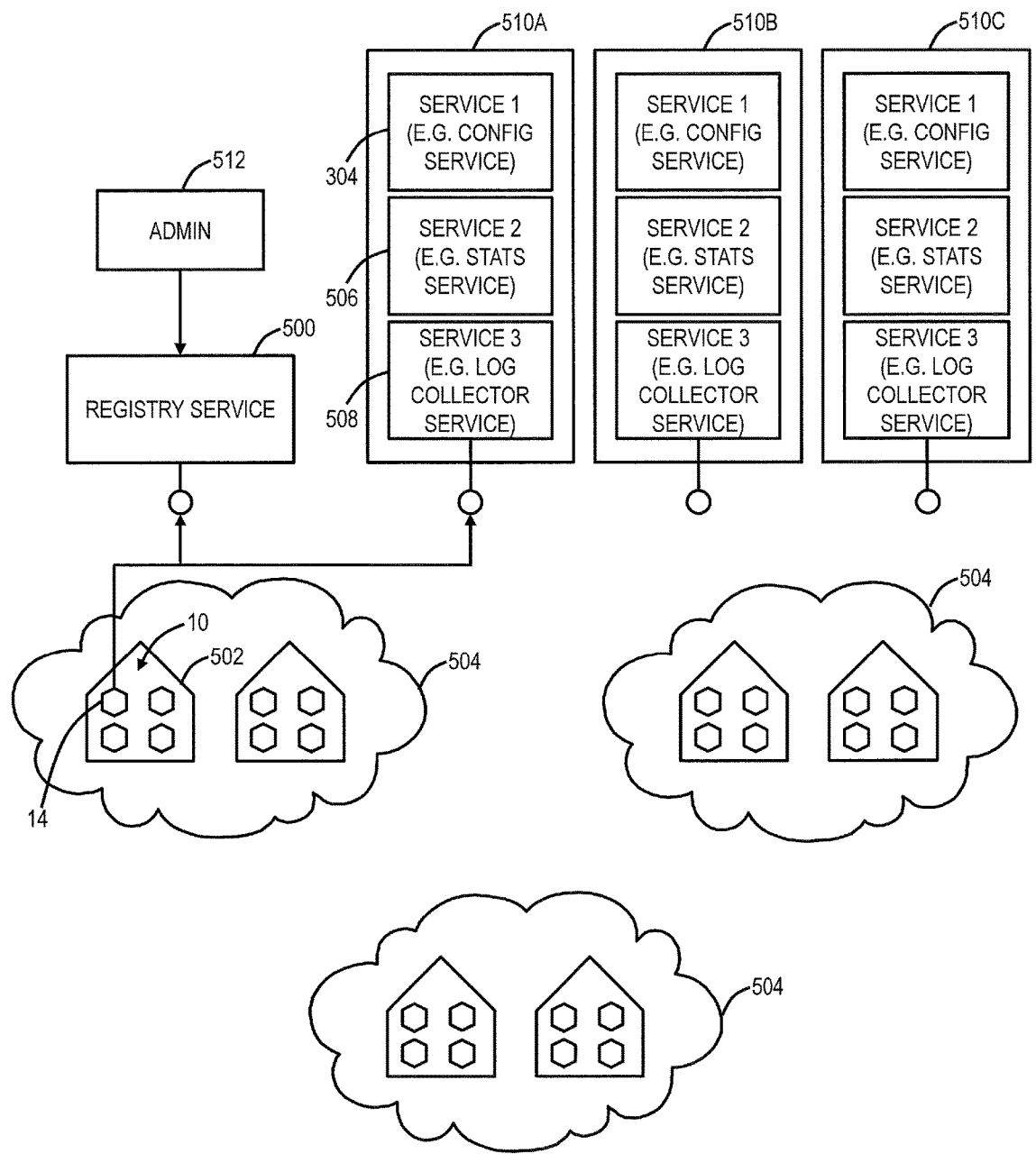
FIG. 11 is a network diagram of various distributed Wi-Fi systems which connect to a centrally managed registry for directivity to cloud services.

Referring to FIG. 11, in an exemplary embodiment, a network diagram illustrates various distributed Wi-Fi systems 10 which connect to a centrally managed registry 500. As described herein, it is assumed that the access points 14 know the address of the cloud services 302, 304 to which they need to connect. Conceptually this is simple, but in practice it can be difficult to maintain a constant location to which all types and generations of access points 14 can connect to get the services 302, 304 they need. This problem can be overcome with a centrally managed registry 500 of service 302, 304 locations. For example, millions of access points 14 across consumer residences 502 are deployed across different networks 504 and these access points 14 must connect to different services 302, 304 hosted in the public cloud across their life cycle. As described herein, the services can include the authentication service 302, the cloud configuration service 304, a statistics service 506, a log collector service 508, etc. Furthermore, there are different environments 510A, 510B, 510C (such as development, Quality Assurance (QA), and production, or different operator groupings for specific ISPs) running at different locations. It is inconvenient (requires custom build time configuration for each environment 510A, 510B, 510C) and inflexible (service location cannot be changed once burned into firmware—or requires re-flashing firmware to connect to different locations) to statically configure the service locations in the access point 14 firmware.

To address these issues, the centrally managed registry 500 runs at a well-known, stable, and static location. The centrally managed registry 500 is configured by an admin 512 using an admin User Interface (UI), tools, or Application Programming Interfaces (APIs), to map various nodes to service locations they should connect to. The centrally managed registry 500 is configured in all access points 14 during their firmware installation. When the access points 14 power up and perform the Wi-Fi setup process 400, the access points 14 first establish a connection with the centrally managed registry 500. The centrally managed registry 500 queries the access points 14 for metadata information such as serial number, firmware version, public IP address (from which the access point 14 geo-location can be roughly estimated). The centrally managed registry 500 uses the metadata against its internally configured map to determine locations of various services 304, 506, 508 that the access point 14 should connect to. It is the centrally managed registry 500 that sets the locations of the services on the access point 14 and the access point 14 uses these locations to connect to the services 304, 506, 508 in the cloud 12. Any time the access point 14 reboots (potentially on command from the cloud controller), it goes through this same process—thereby allowing the admin 512 to change the service locations over a period of time, and migrate the access points 14 from one service location to another, such as for versioning, upgrades, scalability, high availability, etc. This approach is illustrated in FIG. 11.

The registry-based re-direction approach allows configuration a single service location, i.e., the centrally managed registry 500, in the access point 14 firmware, thereby decoupling the access point 14 firmware from service locations that may change over time, or be different for different environments 510A, 510B, 510C. The centrally managed registry 500 allows cloud based services to migrate over time to accommodate multiple access point firmware versions deployed and supported simultaneously. The centrally managed registry 500 allows cloud based services to scale out horizontally by allocating groups of access points 14 to the particular service instance. The centrally managed registry 500 allows cloud based services to become highly available as access point 14 can fall back on the centrally managed registry 500 to look up another location when the original service becomes unavailable.

Constraining Nodes

Figure 12:
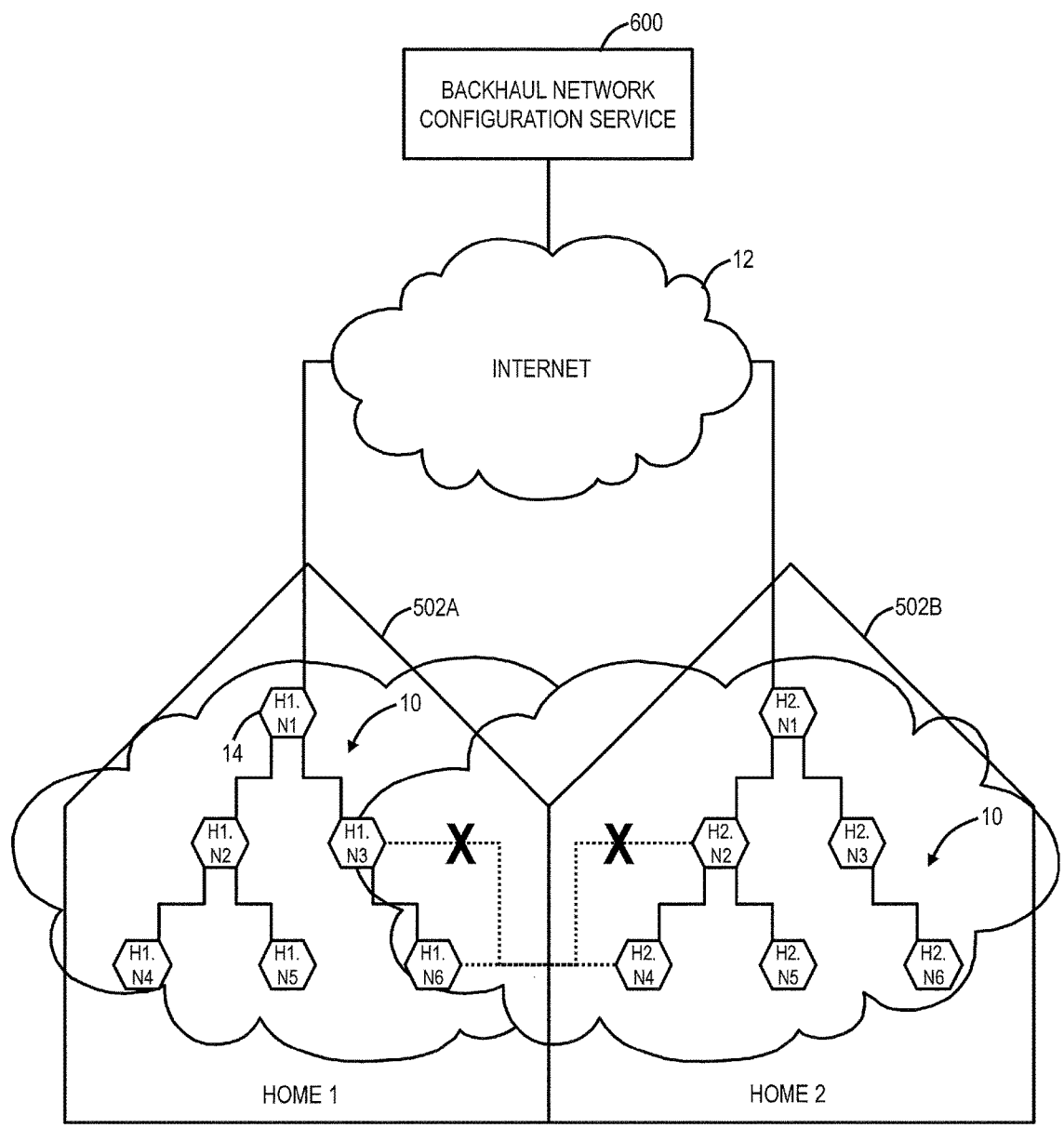
FIG. 12 is a network diagram of two adjacent residences with distributed Wi-Fi systems configured therein.

Referring to FIG. 12, in an exemplary embodiment, a network diagram illustrates two adjacent residences 502A, 502B with distributed Wi-Fi systems 10 configured therein. The distributed Wi-Fi systems 10 include various access points 14 labeled as H1.N1, H1.N2, . . . , H2.N1, H2.N2, . . . where H1 is the residence 502A and H2 is the residence 502B, and Nx is access point x therein (x=1, 2, 3, . . . ). A major concern in the startup of any distributed Wi-Fi system 10 is getting the access points 14 to connect to the correct network. Because wireless signals can travel to a neighboring residence 502A, 502B, there is a risk that an access point 14 will connect to a neighbor's network. It is, therefore, beneficial to establish a system that will constrain access point 14 from connecting to a neighbor's network. In FIG. 12, a backhaul network configuration service 600, connected to the cloud 12 (Internet), is illustrated to constrain access points 14.

As described in the Wi-Fi setup process 400, the access points 14 form the distributed Wi-Fi system 10 by connecting to other access points 14 within the residences 502 over the predefined SSID with the gateway access point 14 connected to the cloud 12 via the wired connection. The predefined SSID can be referred to as a backhaul SSID. In order to form the distributed Wi-Fi systems 10, the same backhaul SSID and authentication mechanism to the SSID are used in all access points 14. When neighboring residences 502 with the distributed Wi-Fi systems 10 are close to each other, access points 14 from one residence 502A (H1.N1 . . . H1.N6) belonging to one customer may be able to see and connect to the SSID broadcast from access points 14 in the neighboring residence 502B (H2.N1 ... H2.N6). This is undesirable since it will end up running one customer's traffic through another customer's internet connection, and must be avoided.

The backhaul network configuration service 600 is hosted and running in the cloud 12, such as with its location known by the centrally managed registry 500. The backhaul network configuration service 600 and the cloud service 304 ensure all access points 14 can get configured by the backhaul network configuration service 600. When a user obtains a plurality of access points 14 and prior to the Wi-Fi setup process 400, the user can "claim" the access points 14 using a mobile device, mobile application (e.g., iOS or Android), and a Bluetooth beacon beamed from the access points 14. With this information, the backhaul network configuration service 600 knows which access points 14 belong to which distributed Wi-Fi system 10, and the backhaul network configuration service 600 can ensure the access points 14 do not connect to neighboring nodes even though the predefined SSID is visible/connectable. The claimed nodes for each residence 502A, 502B are registered with the backhaul network configuration service 600 such that the backhaul network configuration service 600 knows which access points 14 belong to which residence 502A, 502B. Note, this registration can occur over a network separate from the distributed Wi-Fi system 10, such as a LTE, 3G, other Wi-Fi networks etc., i.e., the mobile device can communicate the claimed nodes via the mobile app to the backhaul network configuration service 600.

In FIG. 12, an exemplary operation is now described. The first access point 14 H1.N1 is a gateway node which connects to the modem/router 18 and to the cloud 12 to connect to the backhaul network configuration service 600. Based on the claiming process, the backhaul network configuration service 600 can submit a list of candidate access points 14 to the first access point 14 H1.N1. For example, the list can be based on each of the access point 14 (H1.N2 .. . H1.N6) MAC addresses. With this list, the access point 14 H1.N1 knows only to allow these nodes to connect to it, i.e., a whitelist. The access point 14 H1.N1 starts a Wi-Fi service with the predefined SSID (backhaul SSID). The access points 14 H1.N2 ... H1.N6 power up and start looking for the predefined SSID and find the access point 14 H1.N1 hosting the predefined SSID. The access points 14 H1.N2 ... H1.N6 connect to the access point 14 H1.N1 and are allowed to do so since the access point 14 H1.N1 has been pre-configured to allow them access to the backhaul network configuration service 600. The backhaul network configuration service 600 can configure the access points 14 H1.N2 ... H1.N6 through the gateway node.

Now, assume the access point 14 H2.N4 from the neighboring residence 502B can see and attempts to connect to the predefined SSID broadcast from the access point 14 H1.N3 from the residence 502A. The access point 14 H1.N3 will deny access to the access point 14 H2.N4 from the residence 502B since it has been configured to only allow access to cohort nodes within its own residence 502A. Of course, this works in the reverse direction.

With the backhaul network configuration service 600, even though access points 14 from neighboring residences 502 can see each other's backhaul SSID's, they are constrained to connect to access points 14 only within their residence 502 based on the claiming process. This ensures Internet traffic from one customer's devices, and nodes only travel on nodes owned and claimed by that customer for his household and eliminates the risk of data privacy since traffic never travels on neighbor's nodes.

The services 302, 304, 506, 508, 600 can be operated on the server 20 or a plurality of servers 20 in the cloud 12. As described herein, the access points 14 can get to the cloud 12 and to the services 302, 304, 506, 508, 600 using the wired connection to the modem/router 18 and the predefined SSID. All of the access points 14 can continue to serve the predefined SSID even after set up, but this predefined SSID is not open. Specifically, the predefined SSID require certificates in the access points 14. The certificates are stored on each of the access point 14 are used to constrain which access points 14 can get to the cloud 12. The backhaul network configuration service 600 is used to constrain which access points 14 can join which distributed Wi-Fi system 10. Also, these techniques can be used to recover from power outages or the like.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for setting up an access point in a Wi-Fi system, the method comprising:
subsequent to booting up, determining whether the access point is a gateway node with a connection to a modem/router or a Wi-Fi node without a connection to the modem/router;
responsive to determining the access point is the gateway node, connecting to a cloud configuration service for obtaining configuration parameters of the Wi-Fi system therefrom;
responsive to determining the access point is the Wi-Fi node, connecting to a predefined Service Set Identifier (SSID) for obtaining the configuration parameters from the gateway node; and
subsequent to a power failure and recovery, enabling a configuration based on a last known configuration prior to the power failure comprising connections to one or more of parent nodes and child nodes in the Wi-Fi system.

2. The method of claim 1, wherein the access point is configured with a certificate enabling communication on the predefined SSID.

3. The method of claim 1, wherein the access point continues to serve the predefined SSID after configuration and during normal operation to support lost nodes, new nodes, and recovery of nodes.

4. The method of claim 1, wherein, prior to the determining, the access point is claimed and information regarding the access point is communicated to a backhaul network configuration service in the cloud configuration service.

5. The method of claim 1, wherein, during the setting up, the Wi-Fi system comprises a tree topology with a single data path between each node and the gateway node.

6. The method of claim 1, wherein, prior to the connecting to the cloud service, the method further comprising:
receiving the location of the cloud configuration service from a registry service which is configured by an administrator with a location of the cloud configuration service, wherein the access point is programmed with a location of the registry service.

7. The method of claim 1, wherein the configuration parameters comprise a list of access points allowed to connect to the Wi-Fi system and access points which are not on the list are prevented from connecting to the Wi-Fi system.

8. The method of claim 1, wherein the configuration parameters comprise a plurality of a configuration for Wi-Fi service between nodes in the Wi-Fi system, a configuration for Wi-Fi service between nodes and the client devices, an authentication server location, traffic forwarding and routing on the gateway node, and facility settings.

9. The method of claim 1, further comprising:
prior to the access point communicating with the cloud configuration service, preventing other nodes from connecting to the access point to prevent loops.

10. The method of claim 1, further comprising:
configuring the access point with the configuration parameters and notifying the cloud configuration service of a resulting topology of the Wi-Fi system.

11. An access point in a Wi-Fi system, the access point comprising:
a plurality of radios configured to communicate via Wi-Fi; and
a processor communicatively coupled to the plurality of radios and configured to:
subsequent to boot up, determine whether the access point is a gateway node with a connection to a modem/router or a Wi-Fi node without a connection to the modem/router;
responsive to a determination the access point is the gateway node, connect to a cloud configuration service to obtain configuration parameters of the Wi-Fi system therefrom; and
responsive to a determination the access point is the Wi-Fi node, connect to a predefined Service Set Identifier (SSID) to obtain the configuration parameters from the gateway node,
wherein the configuration parameters comprise a plurality of an SSID, a configuration for Wi-Fi service between nodes in the Wi-Fi system, an authentication server location, traffic forwarding and routing on the gateway node, and facility settings.

12. The access point of claim 11, wherein the access point is configured with a certificate enabling communication on the predefined SSID.

13. The access point of claim 11, wherein, prior to determination of the gateway node or the Wi-Fi node, the access point is claimed and information regarding the access point is communicated to a backhaul network configuration service in the cloud configuration service.

14. The access point of claim 11, wherein, during setup, the Wi-Fi system comprises a tree topology with a single data path between each node and the gateway node.

15. The access point of claim 11, wherein, prior to connection to the cloud configuration service, the processor is configured to:
receive the location of the cloud configuration service from a registry service which is configured by an administrator with a location of the cloud configuration service, wherein the access point is programmed with a location of the registry service.

16. The access point of claim 11, wherein the configuration parameters comprise a list of access points allowed to connect to the Wi-Fi system and access points which are not on the list are prevented from connecting to the Wi-Fi system.

17. An access point in a Wi-Fi system, the access point comprising:
a plurality of radios configured to communicate via Wi-Fi; and
a processor communicatively coupled to the plurality of radios and configured to:
subsequent to boot up, determine whether the access point is a gateway node with a connection to a modem/router or a Wi-Fi node without a connection to the modem/router;
connect to a cloud configuration service when the access point is a gateway node to obtain configuration parameters of the Wi-Fi system therefrom;
connect to a predefined Service Set Identifier (SSID) when the access point is a Wi-Fi node to obtain the configuration parameters from the gateway node; and
responsive to a determination the access point is the gateway node, connect to a cloud configuration service to obtain configuration parameters of the Wi-Fi system; and responsive to a determination the access point is the Wi-Fi node, connect to a predefined Service Set Identifier (SSID) when the access point is a Wi-Fi node to obtain the configuration parameters from the gateway node; and subsequent to a power failure and recovery, one of i) enable a configuration based on a last known configuration prior to the power failure comprising connections to one or more of parent nodes and child nodes in the Wi-Fi system, and ii) utilize the predefined SSID to repeat the determining and the connecting steps.

18. The access point of claim 17, wherein the access point is configured with a certificate enabling communication on the predefined SSID.

19. The access point of claim 17, wherein, prior to determination of the gateway node or the Wi-Fi node, the access point is claimed and information regarding the access point is communicated to a backhaul network configuration service in the cloud configuration service.

20. The access point of claim 17, wherein, during setup, the Wi-Fi system comprises a tree topology with a single data path between each node and the gateway node.

* * * * *